United States Patent [19]

Iddon et al.

[11] Patent Number: 5,634,009
[45] Date of Patent: May 27, 1997

[54] NETWORK DATA COLLECTION METHOD AND APPARATUS

[75] Inventors: Robin A. Iddon, Edinburgh; Peter F. Palmer, Midlothian; Richard McBride, Musselburgh; John Briggs, Loanhead, all of United Kingdom

[73] Assignee: 3COM Corporation, Santa Clara, Calif.

[21] Appl. No.: 549,323

[22] Filed: Oct. 27, 1995

Related U.S. Application Data

[63] Continuation of Ser. No. 130,317, Oct. 1, 1993, abandoned.
[51] Int. Cl.$^6$ .................................................. G06F 15/163
[52] U.S. Cl. ........................ 395/200.11; 395/200.02; 395/200.13; 395/415; 395/416; 395/417; 395/610; 395/616; 395/838; 364/DIG. 1; 364/242.94; 364/284.4; 364/269.4
[58] Field of Search ........................... 395/600, 200.11, 395/838, 200.02, 200.13, 415, 416, 417, 610, 616; 370/17, 60, 85.8, 94.1; 364/DIG. 1

[56] References Cited

U.S. PATENT DOCUMENTS

| | | | |
|---|---|---|---|
| 4,251,858 | 2/1981 | Cambigue et al. | 364/102 |
| 4,718,060 | 1/1988 | Oguchi et al. | 370/85 |
| 4,747,100 | 5/1988 | Roach et al. | 370/86 |
| 4,817,080 | 3/1989 | Soha | 370/17 |
| 4,933,937 | 6/1990 | Koshini | 370/85.13 |
| 4,939,726 | 7/1990 | Flammer et al. | 370/94.1 |
| 4,943,963 | 7/1990 | Waechter et al. | 370/94.1 |
| 5,027,350 | 6/1991 | Marshall | 370/85.13 |
| 5,218,603 | 6/1993 | Watanabe | 370/85.13 |
| 5,317,564 | 5/1994 | Nugent | 370/17 |
| 5,321,605 | 6/1994 | Chapman et al. | 364/402 |
| 5,325,505 | 6/1994 | Hoffecker et al. | 395/425 |
| 5,331,634 | 7/1994 | Fischer | 370/85.13 |
| 5,333,183 | 7/1994 | Herbert | 379/112 |
| 5,337,309 | 8/1994 | Faulk, Jr. | 370/60 |
| 5,430,709 | 7/1995 | Galloway | 370/13 |
| 5,450,601 | 9/1995 | Okuda | 395/800 |
| 5,502,818 | 3/1996 | Lamberg | 395/200.16 |

*Primary Examiner*—Thomas G. Black
*Assistant Examiner*—Jean R. Homere
*Attorney, Agent, or Firm*—Weingarten, Schurgin, Gagnebin & Hayes LLP

[57] ABSTRACT

Disclosed are a method and apparatus for collecting network data from a computer network. Control structures are created for groups of data to be collected. The control structures are then associated with corresponding tables for storing the data. Different control structures and extract functions are defined depending upon which data is to be collected, and the form in which the data is to be presented. These control structures and extract functions are then employed to avoid redundant data gathering efforts.

20 Claims, 8 Drawing Sheets

NETWORK DATA COLLECTION METHOD AND APPARATUS

This application is a file-wrapper continuation of application Ser. No. 08/130,317, filed Oct. 1, 1993, now abandoned.

FIELD OF THE INVENTION

The present invention relates to computer network management and, in particular, to collecting network data with a scalable data engine.

BACKGROUND OF THE INVENTION

Computers are commonly arranged into networks to allow intercommunication. Depending upon the interconnection technology, these networks can span great distances. Moreover, the networks can employ one or more communication protocols, devices may be added or removed from the network arbitrarily, communication paths may change, and the nature and characteristics of the network traffic is variable. As such, the management of these systems has become increasingly complex.

Among other things, network management typically entails determining which sections of a computer network are over- or under-utilized. In addition, it includes detecting and locating network faults so that repairs and/or re-routing of the network can be made, if necessary.

In order to perform these network management functions, network management tools have been developed to assist the MIS expert in managing the network. Network management tools employ software applications that allow the MIS expert to diagnose the network and thereby minimize maintenance cost by efficiently utilizing the MIS expert's time. Sometimes, these tools include dedicated hardware.

Some older network management tools performed these tasks by periodically polling certain devices connected to the network. A device connected to the network is commonly called a network node, or just node. This approach is sometimes referred to as the "ping" approach. Though this approach could determine connectivity and operability of the nodes, it could not effectively provide the full range of functionality that network professionals desired. For example, it was impractical for these systems to gather utilization statistics, and connectivity analysis is only a small portion of the task of isolating network problems.

Later, protocol analyzers were developed, which provided the capability of collecting basic statistics and filtering for and decoding of specific packets. It will be appreciated that the structure of a packet will depend upon the underlying protocol. However, protocol analyzers require a technician to take equipment to the problem, once it is discovered.

Still later, network management tools used dedicated nodes to monitor all of the network traffic passing the node. These dedicated nodes used embedded systems, i.e., microprocessors and memory storing task-specific software, to monitor network traffic passing the node. By judiciously placing these nodes into different network segments, the tools could gather information about all of the network traffic. These systems provide more functionality, but have stringent performance requirements, as they require the node to handle all network traffic passing the node.

Standards, such as SNMP, were eventually developed to facilitate development among different network management software suppliers (SNMP: Standard Network Management Protocol). SNMP outlines what statistical data should be gathered and available to the network. Software developers can then write their applications, knowing that any system which complies with the standard will provide this data. These type of standards, among other things, facilitate the development of distributed network management.

Within SNMP, RMON MIB was developed as a standard management information base ("MIB"). It will be appreciated that a MIB is a collection of data and that a MIB is in no way limited to the RMON specification. For an Ethernet segment, RMON requires nine groups of data: Statistics Group; History Group; Host Group; Host TopN Group; Matrix Group; Alarm Group; Filter Group; Packet Capture Group and Event Group. This set of data is then available to the network management platform or other application. For token rings, RMON requires ten groups, the nine outlined above plus a token ring group.

SNMP effectively defines the network as a world full of objects, each having a type and value. SNMP does not instruct how this data ought to be collected and compiled. SNMP will not be further discussed herein, as it is known in the art.

Basically, this newer architecture has a plurality of dedicated nodes placed throughout the network. Each of these dedicated nodes is constantly gathering information about its corresponding network segment. This process of gathering information is called "per-packet updating." In such a process, the dedicated node receives each packet that passes the node and analyzes the packet in order to update corresponding data structures, typically tables. For example, if SNMP is used on an Ethernet and if SNMP is using a RMON-like MIB, the per-packet update would need to update the data structures corresponding to the nine groups.

At some point, the network management tool will likely request this data from the dedicated nodes. For example, it may request this data to display it in graphical form, or it may request this so that it can perform some further data analysis. In any event, SNMP requires that the data be available for external query. The network management tool communicates with the dedicated node, for example by SNMP, by requesting the particular data.

This newer architecture of using dedicated nodes and communication protocols implicitly demands that the dedicated nodes have a very high network performance. Typically the dedicated node needs a network performance an order of magnitude higher than a "normal" node. This is so because the dedicated nodes must be able to process aggregate network traffic, whereas a normal node typically needs to handle bandwidths associated with typical network communications. If a normal node gets congested, it can typically rely upon standard retry algorithms, known in the art, to ensure that it will eventually get the packets intended for it. On the other hand, if the dedicated node gets congested, any missed packet would go unproccessed because when the dedicated node is operating passively and promiscuously it should not request a retry. It will be appreciated that the underlying network protocol defines the process for rejecting and retransmitting packets.

In order to meet these stringent performance requirements, the prior art used dedicated nodes having embedded systems, which relied upon in-line programming for the microprocessors. It was thought that in-line programming was necessary to meet the stringent performance requirements. Essentially, in-line programming is a single stream of code (i.e., program instructions) with no jumps, procedure calls, function calls, or other breaks in the control of the code. As such, in-line code quickly becomes cumbersome, complex, and difficult for a software engineer to understand.

In the context of network management tools, multiple tables of information in a memory unit usually need to be managed. Often this management contains a certain set of common operations associated with each table and a certain set of unique operations associated with each table. With in-line programming, however, even the common operations must be reiterated at each instance of the management of each table. If a programming bug is present within the common operations, this programming bug will be present at each instance, i.e., for each table. In contrast, if a procedure or function is used for the common operations, the bug will have only one instance.

Moreover, it is highly likely that the code will need to undergo subsequent revisions. In-line programming requires that the programmer decipher the in-line code to discern the exact code fragments that need updating. Similarly to that described above, this update will need to be done at each instance, in contrast to a single instance if procedures and functions are used. This is especially complex in prior art systems as in-line programming is non-modular, and the programmer will have to be wary of protocol sensitive code.

Dynamic module loading, which has been used in other contexts, such as Microsoft Windows' Dynamic Linked Libraries, may be very useful for a dedicated node. For example, such dynamic loading can be helpful for implementing a sophisticated version and release control, in which different network segments can have different combinations of the software. For example, one segment of the network may need a particular application, such as a proxy manager or an accounting package, that the other network segments do not need. Dynamic loading allows the different combinations of software residing on the various segments to be tailored to the system's needs. Dynamic loading also benefits the software distributor, as it will not need to re-link the various software combinations in order to release them (Linking and re-linking software are known in the art). In addition, such loading is also helpful for implementing transient diagnostics. Dynamic loading is extremely difficult to implement with an in-line program technique because the new code will need to be concatenated with the existing code and any new code will need to employ some form of memory address independence (e.g., self-relative addressing) to ensure operability. Though such a process is theoretically possible, the high level of difficulty for doing such a task will be appreciated by those skilled in the art.

All in all, the prior art systems with their use of in-line programming greatly add to development costs and times by requiring more sophisticated programmers to understand the complex, non-modular code.

In connection with this, one can expect that new network management standards will be developed in the future. It is likely that these standards will require more sophisticated statistics and the like. The prior art approach requires that a new in-line program be developed for each new standard. This greatly adds to the development cost and greatly increases the implementation time.

SUMMARY OF THE INVENTION

The shortcomings of the prior art are overcome and other objects are accomplished with a system employing a sufficient number of network nodes connected throughout a computer network adapted to collect network data, wherein each such node has a network interface to translate the electronic signals on the network into a digital form, a memory for storing the digital form, and a CPU for processing the digital form in accordance with software modules stored in the memory, the software modules including a scalable network data engine that is independent of the network protocol of the computer network, and wherein the network data engine is executed by the CPU to provide the functionality for creating and deleting tables within the memory, updating table entries within the tables, inserting and deleting entries from the tables, and searching the tables according to a plurality of indices.

Within this description, reference to the network data engine providing some function is to be understood as the CPU executing the network data engine so as to provide that function.

The network data engine further provides a base set of table functionality and provides a mechanism for calling routines external to the network data engine but residing within the memory. As such, a network application that needs tables need only supply code that is specific to the individuality of each table and need only supply certain information concerning the tables to the network data engine. It will be appreciated that the particular application can correspond to SNMP or to any other application that needs a plurality of tables.

The tables upon which the network data engine operates will likely include the tables required by the network management protocol being used by the network. However, the tables can also include general purpose tables.

As new network standards are developed, the dedicated node utilizing the present invention can be easily updated and ported, as the data engine is independent of the protocol and operates on tables only generally and is not table specific. As such, a new protocol, requiring new tables, can use the network data engine without revision. An implementation of a new protocol need only include new code for each new table's specific individuality.

The present invention provides a mechanism for allowing time based statistics on each table and allows for dynamic loading of modules into the memory of the dedicated node.

BRIEF DESCRIPTION OF THE DRAWING

The invention will become more apparent from the following detailed specification and drawing in which.

DETAILED DESCRIPTION

Figure 1:
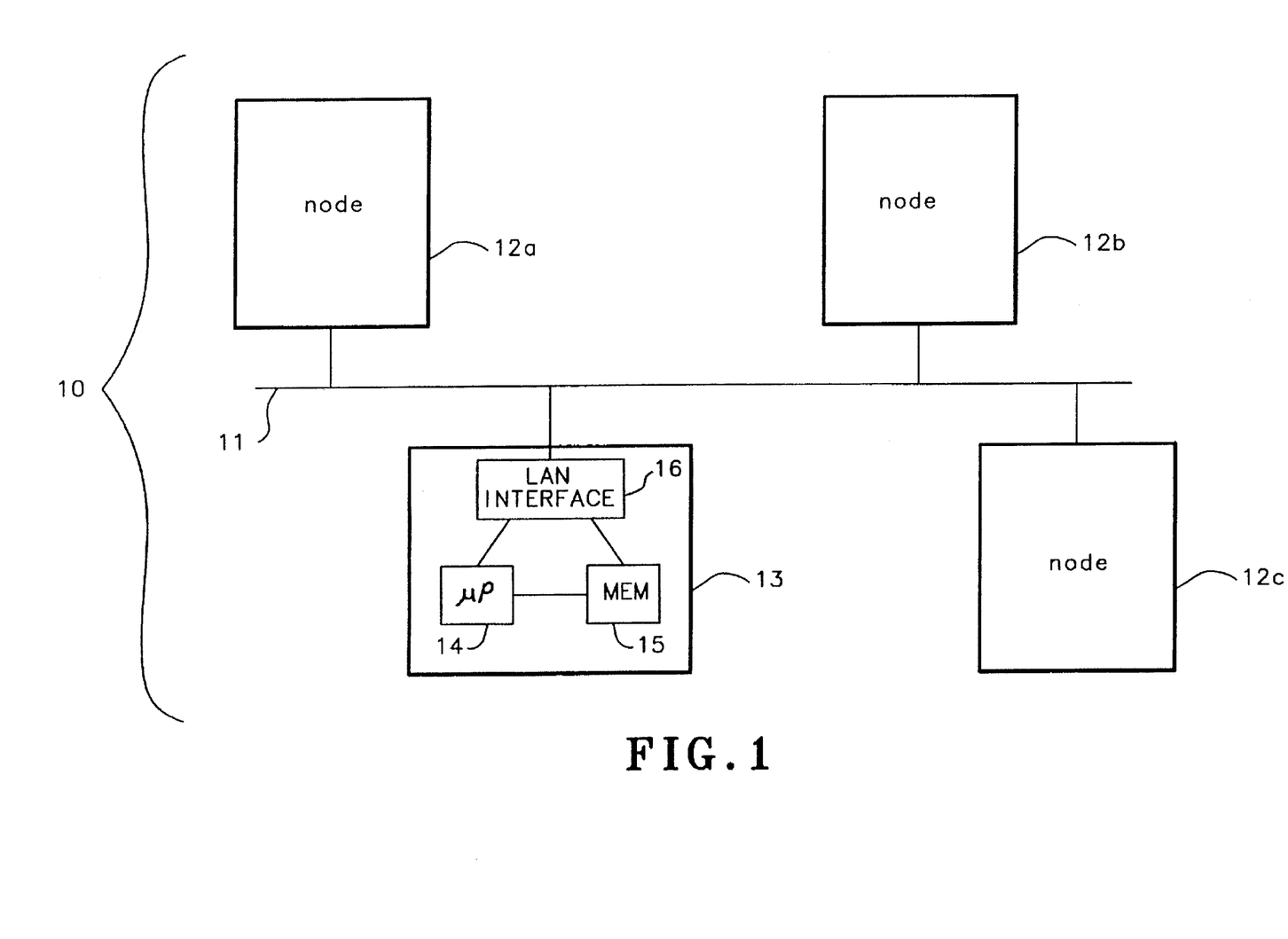
FIG. 1 illustrates a network segment.

FIG. 1 illustrates a network section 10 of a computer network. A communication cable 11 interconnects the various network nodes 12. Each network node 12 can typically operate autonomously. However, often these nodes 12 cooperate to perform a large task by distributing the work among the various nodes. Though the figure illustrates a network section only, it will be appreciated that such segments can be arranged in various network topologies, such as rings and trees, and that the various segments will likely employ a probe 13. A probe is a network node, dedicated for network management, and is further described below.

In order for one node 12a to communicate with another node 12b, the communication will occur via cable 11. Node 12a will transmit a packet, which will include as a target the address of 12b. Node 12b monitors the cable and detects that the packet is intended for itself by recognizing its address. It will be appreciated that many network protocols allow a broadcast-type communication in which more than one node will receive the communication. It will also be appreciated that the numerous protocols for gaining access to cable 11 as well as for transmitting the network packet are known in the art and that the description above is informational only. These protocols will not be further described herein for the sake of clarity.

In a preferred embodiment, probe 13 utilizes an Intel 80960CA RISC CPU, indicated as 14, 4 MB of memory 15, and the 82596CA LAN interface 16. The several software modules, described below, executed by CPU 14 are written primarily in the C programming language, for example, and may operate under an operating system residing in memory 15 that provides UNIX-like functionality.

Probe 13 operates in a passive and promiscuous mode in which it monitors all packets transmitted on cable 11. The LAN interface 16 translates the electronic signals transmitted on cable 11 into digital form and stores the digital form in memory 15. Then, CPU 14, executing the software modules described below, operates upon this digital form.

Though the description herein refers to the probe as being a dedicated node, it should be appreciated that this is for convenience only. For example, the present invention may be employed in a router and still perform its data collection. Moreover, though the description refers to the probe as receiving all packets passing on the network, it will be appreciated that the present invention is not precluded from an application that operates on a subset of the packets only.

As will be further described below, probe 13 analyzes each packet, i.e., the digital form residing in memory 15, to determine whether the packet is intended for itself. For example, another node may request certain information from probe 13. If a packet is targeted to probe 13, probe 13 will respond accordingly, i.e., like a normal node. If the packet is not intended for probe 13, i.e., the target address is not that of probe 13, probe 13 analyzes the packet in order to update certain tables within memory 15. For example, RMON MIB, a MIB for SNMP, outlines what data should be accessible and how. As such, if the probe 13 is used in an SNMP RMON MIB environment, RMON MIB will determine a minimum set of tables, which probe 13 must keep and manage. As was previously described this process is called per-packet updating and will be further described below.

A network management tool, residing on one or more nodes of the computer network, can then access these tables by communicating certain instructions to probe 13. These instructions are defined by the underlying protocol, e.g., SNMP. As was described above, probe 13 will recognize the packet containing the instruction as intended for itself and respond accordingly.

Figure 2:
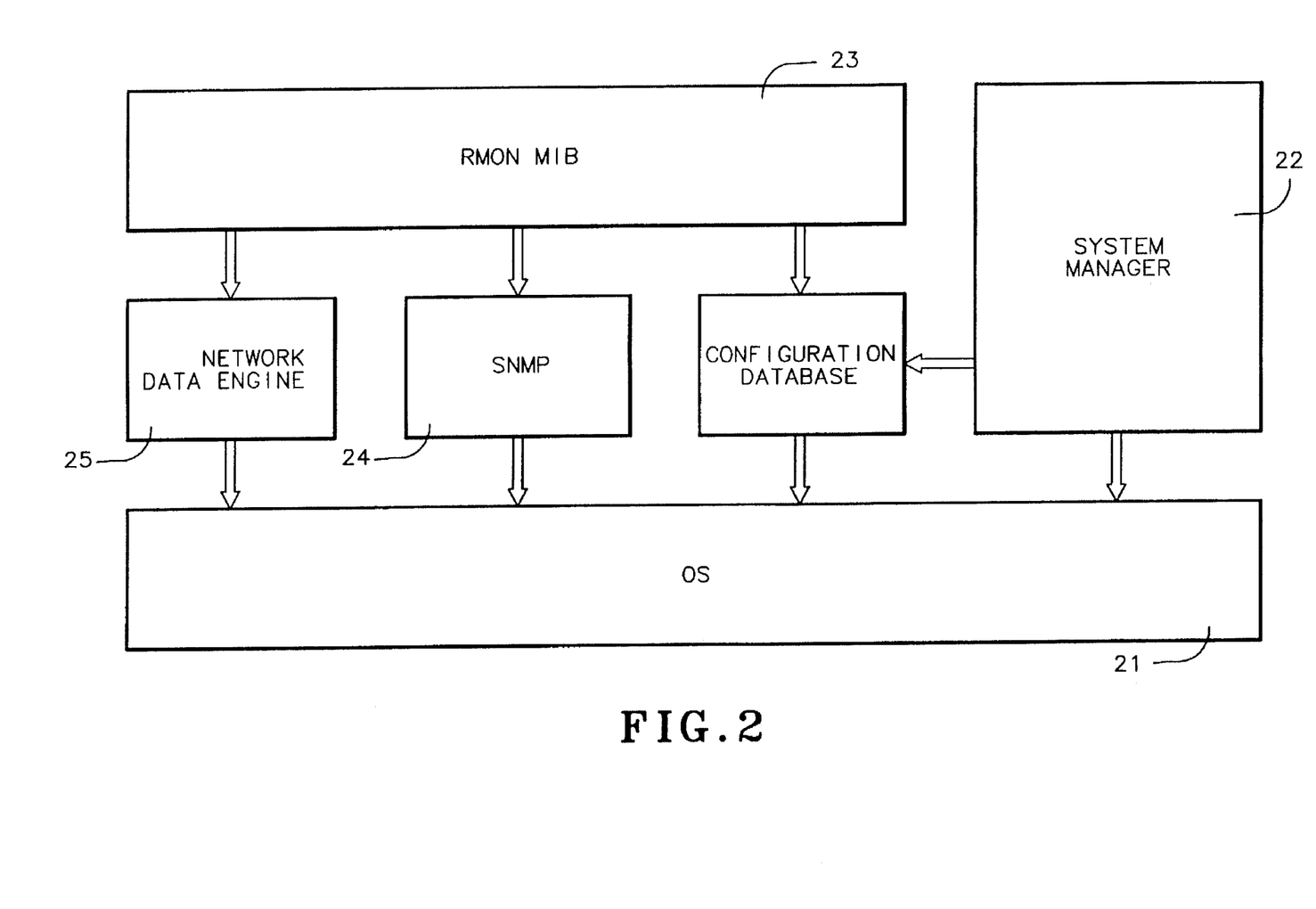
FIG. 2 illustrates a software module architecture for a dedicated node having the present invention.

FIG. 2 illustrates the software module architecture of probe 13. Operating system 21 provides a number of basic operating system functions, such as memory management, event and timing services, process management, I/O services, and numerous device drivers and the like. In a preferred embodiment, operating system 21 is optimized to maximize network packet throughput.

System manager 22 provides a number of ancillary services, such as configuration and module loading, a command line interface, and an interface to serial line access.

The RMON MIB 23 is a management information base. For example, the RMON MIB for the Ethernet has nine groups (see above). Briefly referring to FIG. 4, each group of the MIB may be split into a MIB module 41 and a data collection module 42. The MIB module 41 contains routines and data structures required to represent the corresponding table for the group. The table-specific routines, such as the extract and update routines which are described below, are stored in the data collection module. It will be appreciated that by storing routines in the data collection module the network data engine remains independent of these routines. The process for updating the corresponding tables will be further discussed below. It will be appreciated that different MIB architectures may be utilized by the invention, and for that matter, the invention is not limited to the RMON MIB.

Figure 4:
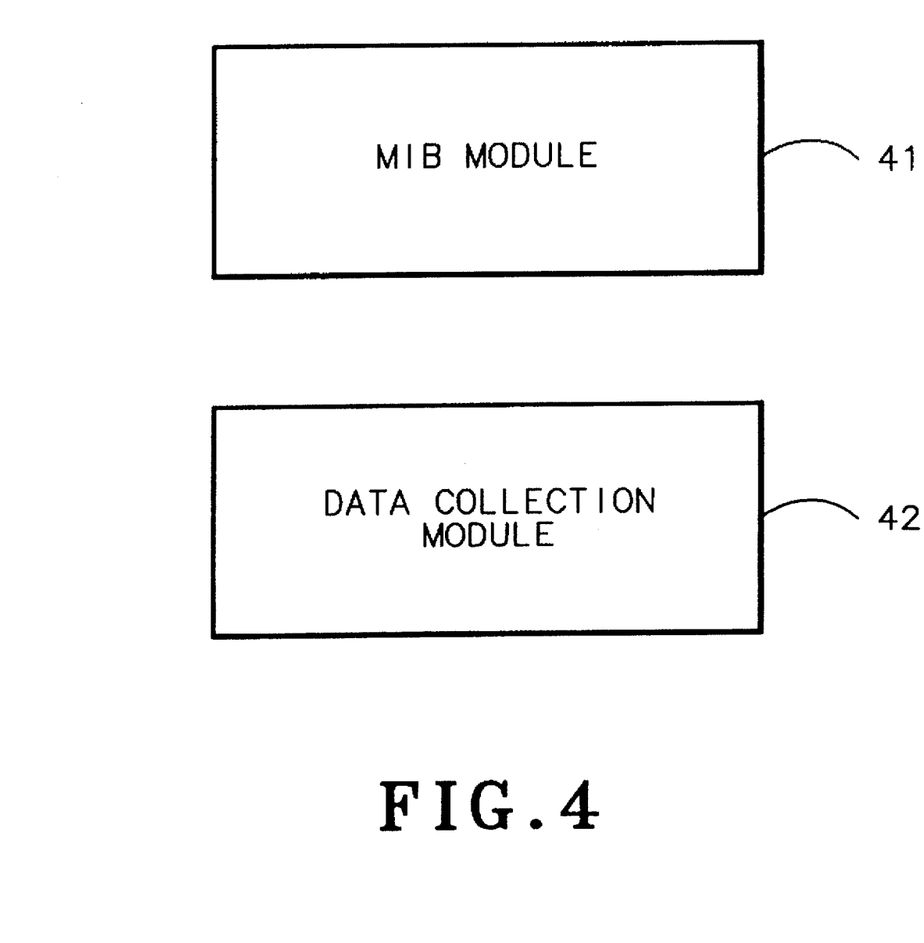
FIG. 4 illustrates a software architecture for a RMON MIB.

By way of example, SNMP RMON MIB requires a matrix group. This group essentially contains information concerning the numerous conversations occurring on the network segment. It contains data such as the network addresses of the communicating nodes and the associated byte count and packet count between the communicating nodes. Moreover, it organizes this data for each direction of the conversation. The group further specifies that the key for accessing data corresponding to this group is the pair of communicating node addresses. In other words, if an application needed the information described above, it would request that data by requesting data from the Matrix group and by providing a key, comprising the network addresses it was interested in. It will be appreciated that this description of the RMON MIB Matrix group has been simplified for descriptive purposes. Further details about the group are not necessary to understand the present invention.

SNMP module 24 includes the necessary software for communicating in accordance with the SNMP protocol. For example, if SNMP data is requested from the probe, the SNMP module will decode the request. As will be more fully described below, this will include decoding the request into a table name and key which will then be used to retrieve the data from the corresponding table. In addition, SNMP module is responsible for initializing certain aspects of the network data engine 25. As previously stated, network data engine 25 operates on data tables only generally. Thus, SNMP module 24 must pass certain information to network data engine 25 so that network data engine 25 can create the appropriate tables and gather an understanding about the tables for which it is responsible for updating. This is achieved by the SNMP module 24 passing information which will be mirrored in a control structure located within the network data engine 25, in particular within the allocation services (see FIG. 3). This control structure is created dynamically. Each table will have its own control structure. Moreover, each table is created dynamically by the data engine 25 and is "owned" by the data engine.

Even though FIG. 2 illustrates module 24 as an SNMP module, it will be appreciated that this module can be replaced by any application that needs to manage tables. For example, if a new network management protocol were developed, the new application would replace SNMP 24 and would need to pass the necessary data to network data engine 25 so that data engine 25 could construct the appropriate control structure.

It will be appreciated that, though the following description uses the terms "structure" and "function" in similar fashion to that of the C programming language, other languages employ different terminology to describe similar facilities and that the present invention is in no way limited to a particular programming language.

Figure 8:
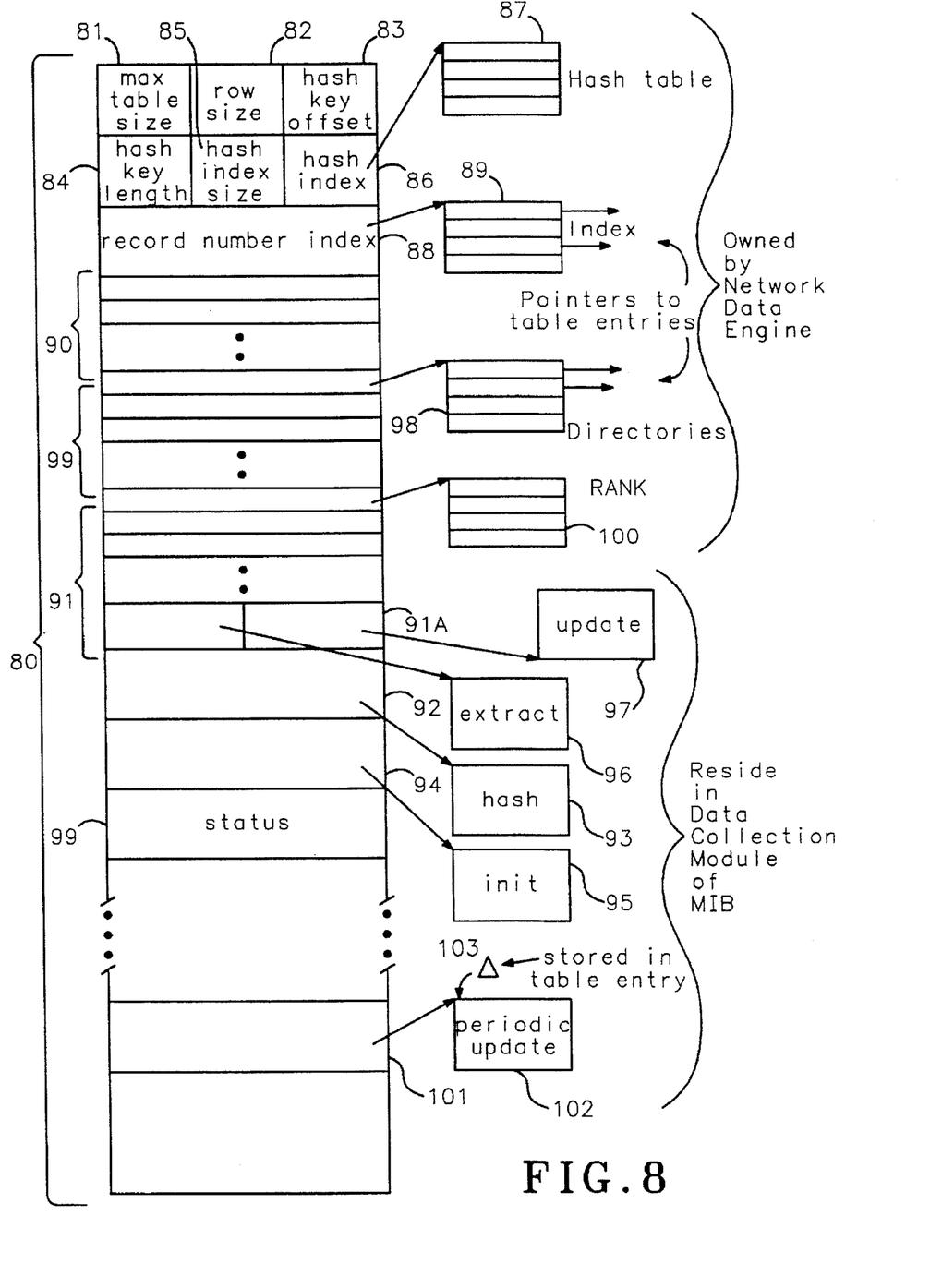
FIG. 8 illustrates a control structure used by a preferred embodiment of the invention.

Referring to FIG. 8, each table has a control structure 80 that includes the following: the maximum number of rows to allow for the table 81; the size of each row 82; the offset from the base of the row to a hash key 83; the size of the hash key; the number of slots in the hash table 85; a pointer 86 to the base of a hash table 87; an array of directory descriptors 90; an array of per-packet update structures 91, which are described below; a pointer 92 to a first stage hash function 92; and pointer 94 to an init function 95.

Each per-packet update structure 91A includes an extract function 96 and an update function 97. These functions will be further described below. Other items included in the control structure will be described below.

Each control structure 80 includes an array of directory descriptors 90, as stated above. A directory 98 is a group of additional indices sorted according to a key. Accordingly, every time an entry is added or deleted from the associated table, the directory needs to be resorted. As was discussed above in the summary of the invention, the particular application may require one or more directories for a group. For example, in the Matrix group, two directories are needed. The key will be the pair of addresses, and there will be one directory corresponding to each direction of communication. Again, the use of directories will depend upon the underlying application.

Figure 3:
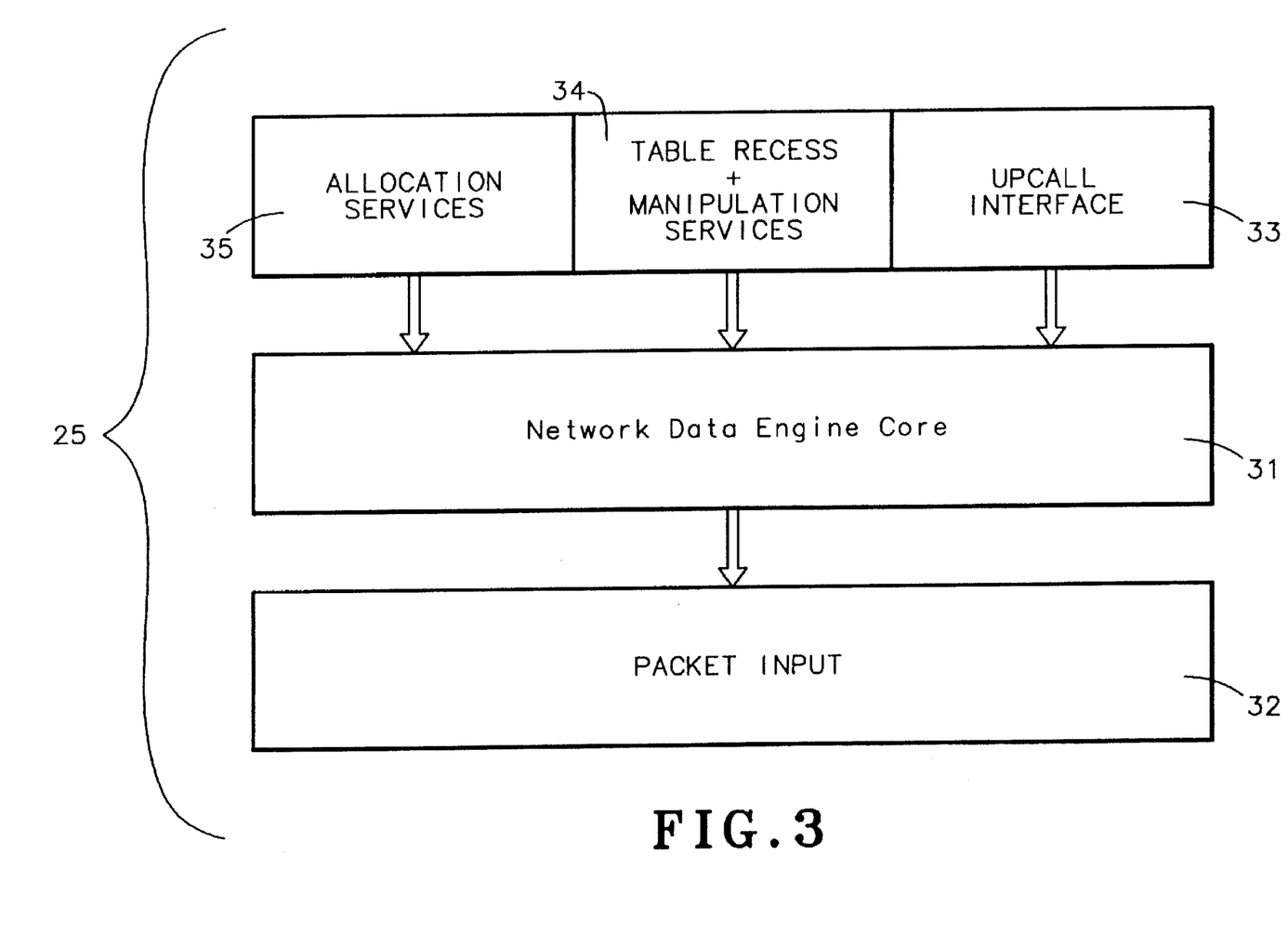
FIG. 3 illustrates a preferred embodiment of the software module architecture of the present invention.
Figure 5:
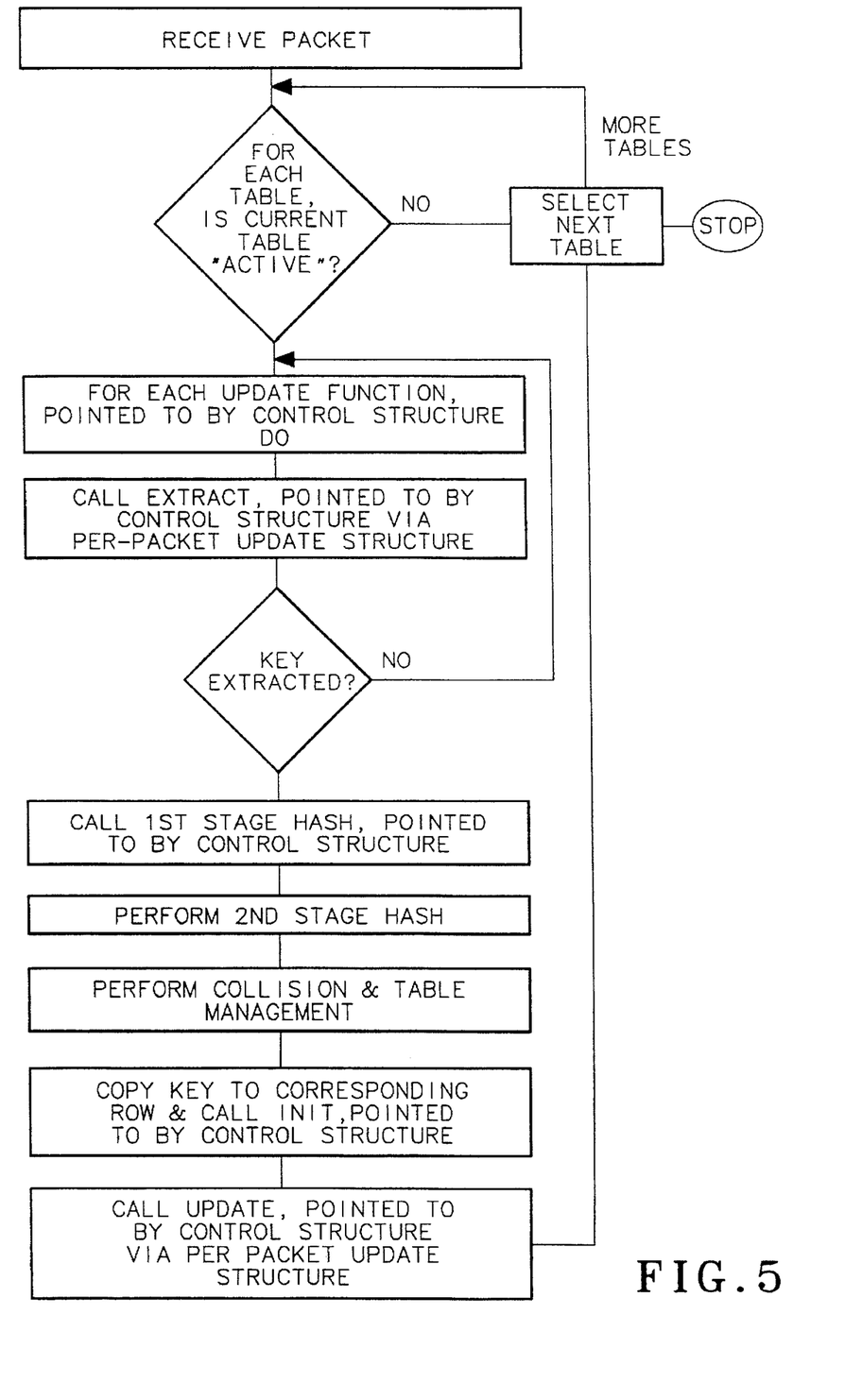
FIG. 5 illustrates in flow chart form the per-packet update process for a preferred embodiment of the invention.

As previously mentioned, network data engine 25 is responsible for updating the various tables on a per-packet basis. FIG. 3 illustrates the software structure of network data engine 25. FIG. 5 shows a flow chart describing the per-packet update process. The network data engine 25 will be described by referring to these figures jointly.

Packet input section 32 receives all network packets that pass probe 13 (see also 51, FIG. 5). These packets are then passed to data engine core 1. Upon receiving a packet, data engine core 31 loops through each table that is marked "active" (i.e., tables may be suspended from per-packet updating). For each active table, the data engine core 31 loops through the array of per-packet update structures 91 (see also 53, FIG. 5).

Within the loop, i.e., the loop corresponding to the per-packet update structures, the network data engine extracts a key from the packet by calling the extract function 96 pointed to by the per-packet update structure 91A (see also 54, FIG. 5).

If the extract function fails to find a key, for example because the packet is too short or because the packet is corrupt, the data engine core 31 aborts this update and proceeds to the next per packet update (see also 55, FIG. 5). If a key is found, the data engine core 31 calls a first stage hash function 93 pointed to by the control structure 80 (see also 56, FIG. 5). This hash function 93 preferably is matched to the nature of the data that is stored within that table. Hash functions desirably provide an even distribution of hash numbers given a distribution of keys. A second stage of hashing is performed by the network data engine itself to insure that the resulting address will fall within the corresponding table (see also 57, FIG. 5).

The network data engine core 31 will perform necessary table management, such as inserting a new entry if necessary (see also 58, FIG. 5). In addition, it will also perform collision handling, for example if two keys hash to the same table entry (see also 58, FIG. 5). Collision handling and table management are known in the art.

The network data engine core 31 also calls an init function 95 pointed to by the control structure 80 whenever a new table entry is created, i.e., whenever it is the first instance of a key (see also 59, FIG. 5). If the packet had error status it is likely that the application would prefer to not process that packet. The init function 95 would then include the appropriate code to abort further processing for this table.

Lastly, the core 31 also calls an update function pointed to by the per-packet update structure 91A (see also 60, FIG. 5). This function usually contains the "guts" of per-packet updating. Again, this function, like those described above is application specific, and the data engine 25 remains independent of it.

It will be appreciated that this process is independent of the underlying protocol, e.g., SNMP, as the control loop operates on the various tables only generally and calls external routines to handle the peculiar aspects of the particular table.

The upcall interface 33 handles the external function calling, referred to above. The allocation services 35 allows the creation and deletion of network data engine tables, and the ability to activate or suspend existing tables. Tables are usually created at initialization and can be deleted, if necessary.

Table access and manipulation services 34 allow the underlying application, e.g., the SNMP application, to access the data that is being collected. Each table can be accessed using any one of its indices. This section is also responsible for table entry insertion and deletion as requested by the associated application, i.e., SNMP. The indices automatically recalculate after each insert and delete operation. For example, an insertion will occur when the probe receives a packet from a node for the first time.

Data entry core 31 provides synchronization for the tables. This is necessary because the tables need read and write access from multiple sources, such as during per packet updates and from SNMP requests. Synchronization methods are know in the art, and will not be further discussed herein other than to state that, in a preferred embodiment, the network data engine 25 operates at a process level higher than the associated application, i.e., SNMP.

Since network data engine 25 is independent of the particular protocol, the functions for operating on the various tables are independent of the protocol, as well. As such, the network data engine 25 can be used for general purpose tables used by the various software modules. Moreover, network data engine 25 is easily ported to future protocols and different revisions of an existing protocol, which will require different tables.

Figure 6:
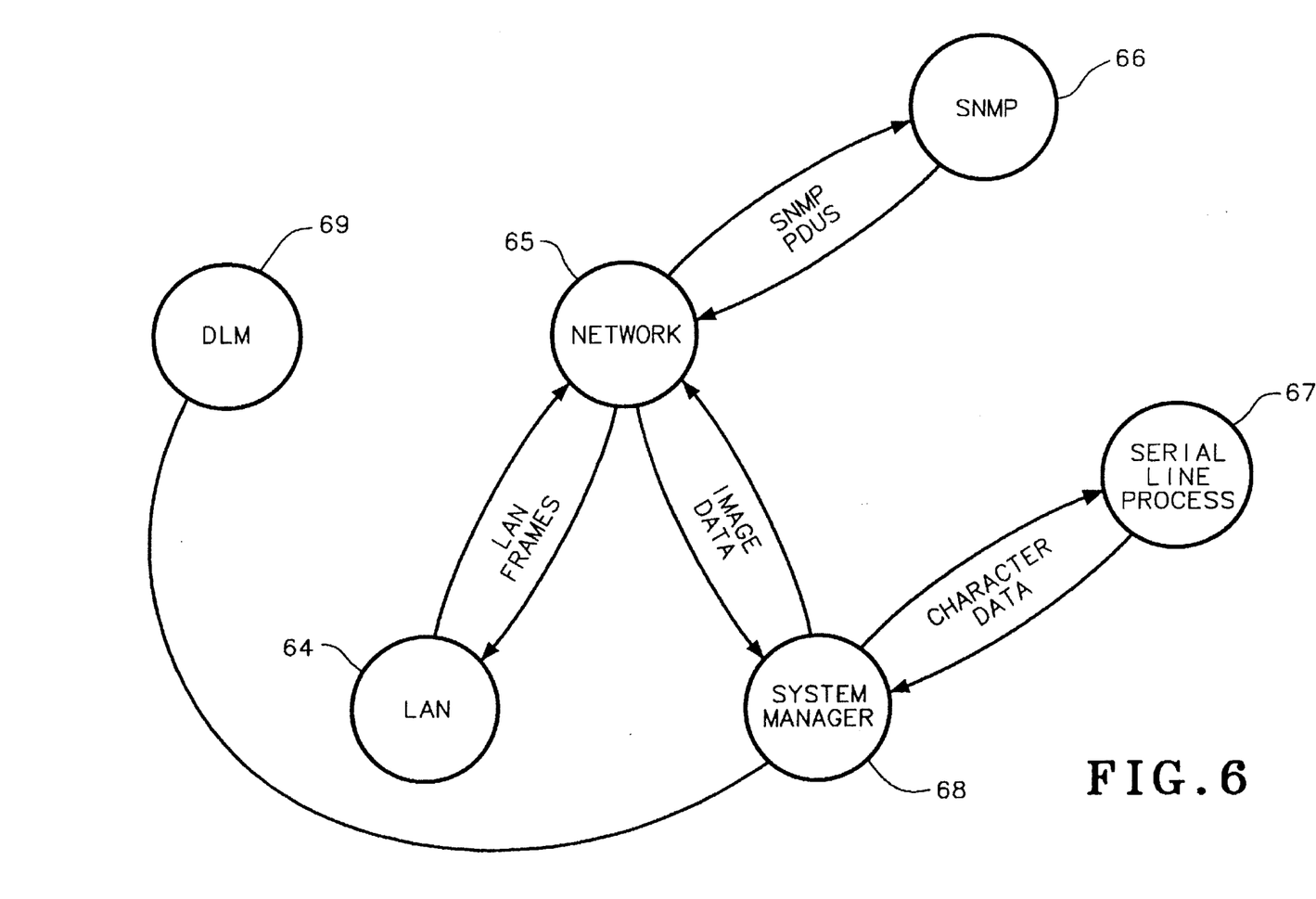
FIG. 6 is a top level process model of a dedicated node.

FIG. 6 illustrates the various software mechanisms of probe 13, displayed as a top level process model. Some abstraction is present for the sake of clarity. This is an alternative way of describing the software architecture. The several software processes correspond to the several modules previously discussed, with minor variations. LAN process 64 handles the network interface. Every time LAN process 64 receives a packet it calls network data engine 25 and passes the corresponding packet with associated status to the network data engine 25. The network data engine 25 is embedded within the LAN process 64, and both operate at Kernel priority level, in a preferred embodiment.

The network data engine then operates as described above. Probe 13 operates in a promiscuous mode, listening to all traffic passing the probe. However, it also receives and transmits packets in similar fashion to other network nodes. If a packet is addressed to the probe, i.e., the target address of the packet corresponds to the probe address, LAN process 64 passes the packet to network process 65, assuming that there are no errors. Network process 65 then either passes the packet up through the various network protocol layers or rejects the packet. For example, if the packet is SNMP related the packet will be passed to SNMP process 66. SNMP process operates at a priority level lower than the LAN process 64, in a preferred embodiment. This process is similar to other network processes known in the art.

Processes 66–68 are similar to the corresponding modules discussed in relation to FIG. 2, and their description will not be repeated herein for the sake of clarity.

The process model illustrated in FIG. 6 is helpful for describing the dynamic software environment of probe 13. This environment allows a dynamic loading of modules. As such, a dynamically loadable module ("DLM") 69 can be transmitted to probe 13, via known file transfer protocols. As such, operating system 21 (see also FIG. 2) will manage DLM 69 in addition to the processes already discussed. It is loaded by system manager 69, as previously stated. This dynamic loading of processes is known within the computer field, but has primarily been used in different contexts. For example, Microsoft allows dynamic loading via its Dynamic Linked Library and UNIX allows such loading via its "Shared Library" utility. Previously, this was impractical for prior art dedicated nodes.

Moreover, the process model displayed in FIG. 6 makes is easier to understand the network data engine in relation to the operating system and the other processes. For example, the present invention can perform table updates periodically. Periodic updates can be performed by calling the appropriate update functions in a timed fashion. Consequently, time-based statistics can be easily implemented. For example, response times for packets can be determined by time-stamping when a request was sent out and noticing when a response was received. It is important to note that SNMP does not suggest or require such statistics.

In order to perform such time-based statistics, the control structure 80 (See FIG. 8) described above also includes a record number index 88 which in effect is an insertion order index. This points to all the valid table entries, but does not require the overhead of using keys. Thus, it provides for faster response in bulk-type transactions.

The control structure also includes an array of rank descriptors 99, a rank 100 being a table of indices sorted by a particular key and updated periodically. As such, they are somewhat akin to directories, but again, directories are updated on insertion and deletion of entries. The control structure 80 also points 101 to a periodic update function 102 that is called once per time interval for each row in the table. In a preferred embodiment, the time interval is one second. The network data engine 25 then loops through each active table and calls the periodic update function for each valid table entry pointed to by the record number index. It will be appreciated that this process allows the underlying application to calculate time-based statistics or to trigger some other time-based activity.

Figure 7:
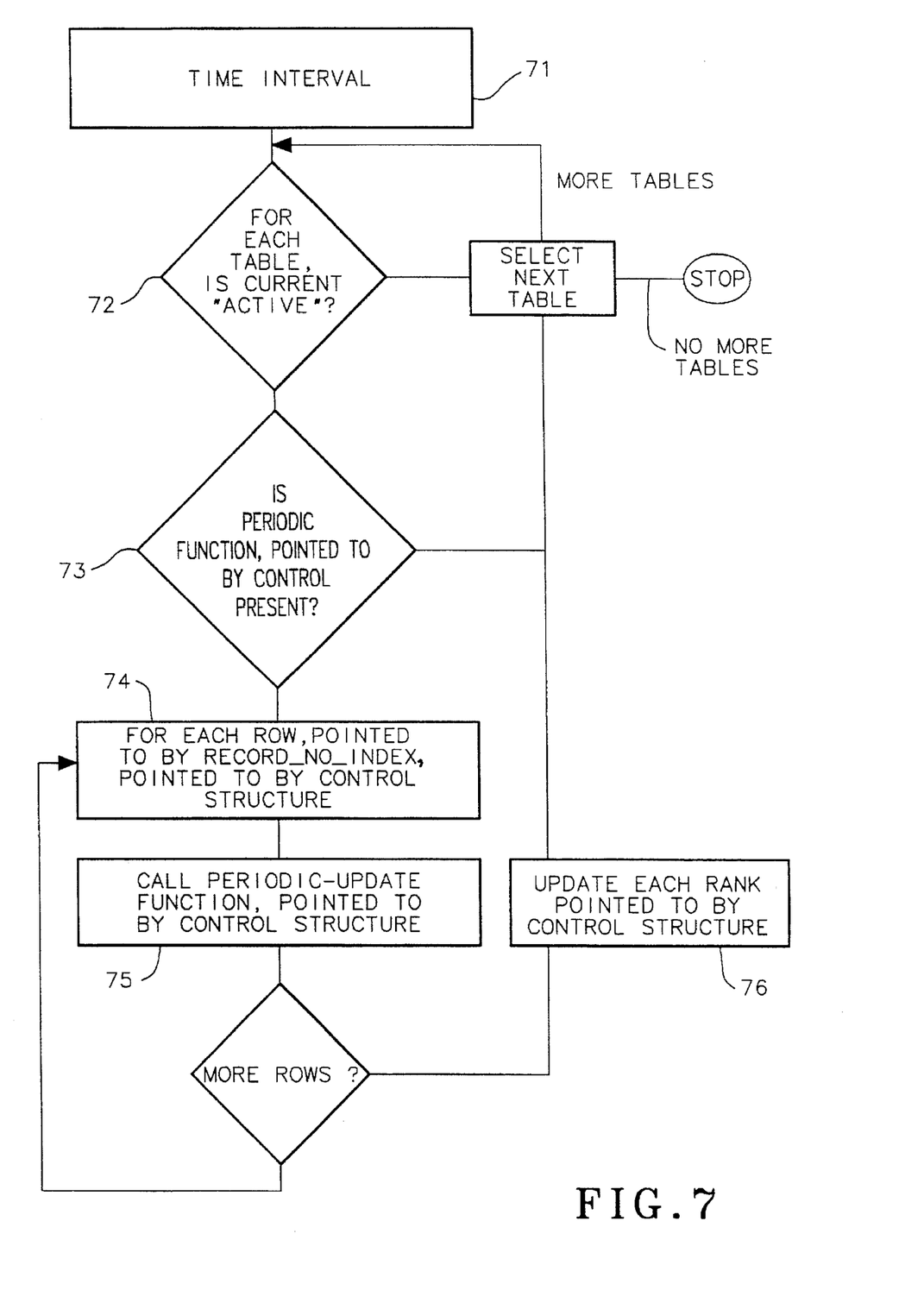
FIG. 7 illustrates in flow chart form the periodic updating performed by a preferred embodiment of the invention.

FIG. 7 illustrates a flow chart describing the periodic update process. Referring to FIG. 7 and 8 jointly, at every time interval 71 the network data engine will loop through each table determining whether the table is marked active 72 (See also 99, FIG. 8). If the table is marked active the network engine determines whether a periodic update function (See also 102, FIG. 8) is present for that table 73. Then, for each row pointed to by the record number index (See 89, FIG. 8), which in turn is pointed to by the control structure 74, the network data engine calls the periodic update function pointed to by the control structure 75. This periodic update function is passed the time delta 103 since the last update in addition to a pointer to the table entry, so that the function can perform accurate time-based statistics. This time delta is necessary to compensate for inaccuracies that might otherwise occur as a result of new table entries, etc.

Having thus described several particular embodiments of the inventions, various alterations, modifications, and improvements will readily occur to those skilled in the art. Such alterations, modifications, and improvements as are made obvious by this disclosure are intended to be part of this disclosure though not exclusively stated herein, and are intended to be within the spirit and scope of the invention. Accordingly, the foregoing description is by way of example only and is not intended to be limiting. The invention is limited only as to find the following claims and equivalents thereto.

What is claimed is:

1. A method of collecting network data from a computer network at a remote node having a processor, an operating system, a network protocol module for communicating on the network in accordance with a predefined protocol, a management information base arranged in accordance with the protocol and having tables for storing the collected data and having corresponding functions for each table including a periodic update function and a network data engine, the method comprising the steps of:

(a) the network protocol module providing a description of the management information base to the network data engine, including providing a description of the tables and providing a pointer to the corresponding periodic update function;

(b) the network data engine receiving the description and constructing therefrom a control structure for each table;

(c) after step (b), the network protocol module monitoring the network and reciveing all packets passing therethrough;

(d) upon receiving a packet, the network protocol module passing the packet to the network data engine;

(e) the network data engine processing the packet in accordance with the control structure for each table;

(f) at predetermined intervals, the network data engine calling the periodic update function for each table to update the table in accordance therewith; and (g) the network protocol module providing a record number index pointing to an index, the index having indices listed in the order of insertion of table entries of the tables.

2. A method of collecting network data from a computer network at a remote node having a processor, and operating system, a network protocol module for communicating on the network in accordance with predefined protocol, a management information base arranged in accordance with the protocol and having tables for storing the collected data and having corresponding functions for each table, including a periodic update function, and a network data engine, the method comprising the step of:

(a) the network protocol module providing a description of the management information base to the network data engine, including providing a description of the tables and providing a pointer to the corresponding periodic update function;

(b) the network data engine receiving the description and constructing therefrom a control structure for each table;

(c) after step (b), the network protocol module monitoring the network and receiving all packets passing therethrough;

(d) upon receiving a packet, the network protocol module passing the packet to the network data engine;

(e) the network data engine processing the packet in accordance with the control structure for each table;

(f) at predetermined intervals, the network data engine calling the periodic update function for each table to update the table in accordance therewith; and (g) the network protocol module providing an array of rank descriptors, cash rank descriptor pointing to a rank, a rank being a table of indices sorted by a corresponding key, and wherein step (f) updates the table via a rank.

3. A method for collecting network data from a computerized network, the method comprising the steps of:

(a) creating, for a plurality of groups of data intended to be collected from the network, a respectively corresponding plurality of control structures;

(b) associating the plurality of control structures with a respectively corresponding plurality of tables, the plurality of tables being adapted to store the plurality of groups of data; and (c) storing, for each one of the plurality of control structures, in an associated one of the plurality of tables, a respectively corresponding one of the plurality of groups of data based on a network packet received from the computerized network, wherein a first set of control structures of the plurality of control structures is associated with a first management information base defining a first set of groups of data of the plurality of groups of data, and wherein step (c) includes a step of:

calling, for each one of the first set of control structures, functions of the first management information base to update a first set of tables of the plurality of tables, and wherein a second set of control structures of the plurality of control structures is associated with a second management information base defining a second set of groups of data different from the first set of groups of data, and wherein step (c) further includes a step of:

calling, for each one of the second set of control structures, functions of the second management information base to update a second set of tables of the plurality of tables, and wherein the functions include a first extract function and a first update function, wherein the first set of tables includes a first table, and wherein the step of calling includes a step of:

invoking the first extract function to extract a first key from the network packet, and the first update function to update the first table according to the first key, and wherein the functions further include a second extract function and a second update function, wherein the first set of tables further includes a second table, and wherein the step of calling further includes a step of:

invoking the second extract function to extract a second key from the network packet, and the second update function to update the second table according to the second key.

4. The method of claim 3, wherein the step of calling further includes a step of:

invoking the second extract function to extract a second key from the network packet, and the second update function to update the first table according to the second key.

5. The method of claim 3, wherein the first table includes a plurality of rows respectively identified by a plurality of keys, and wherein the step of invoking includes a step of:

updating one of the plurality of rows respectively identified by the first key.

6. The method of claim 5, wherein the step of calling further includes a step of:

invoking, when initially none of the plurality of rows is respectively identified by the first key, a create function to insert and initialize a new row respectively identified by the first key, in the plurality of rows of the first table.

7. The method of claim 3, further comprising a step of:

accessing at least one of the plurality of tables to retrieve at least one of the plurality of groups of data.

8. The method of claim 7, wherein the plurality of tables are sorted in a first order and a second order, and wherein the step of accessing includes a step of:

retrieving the at least one of the plurality of groups of data in the first order in response to a first command, and in the second order in response to a second command.

9. The method of claim 3, further comprising a step of:

periodically storing, for a periodic structure respectively corresponding to a periodic table, time based statistics of the computerized network.

10. The method of claim 3, wherein the plurality of control structures is arranged as a linked list of control structures, and wherein step (a) includes a step of inserting a control structure into the linked list.

11. The method of claim 3, wherein the plurality of control structures is arranged as an array of control structures, and wherein stop (a) includes a step of adding a control structure to an end of the array.

12. A system for collecting network data from a plurality of groups of data in a computer network through which network packets flow, comprising:

a plurality of control structures, each control structure corresponding to a group of data from the plurality of groups of data; and a plurality of tables associated with the plurality of control structures, the plurality of tables being adapted to store the plurality of groups of data;

wherein for each one of the plurality of control structures a respectively corresponding one of the plurality of groups of data based on the network packet received from the computerized network is stored in an associated one of the plurality of tables, and wherein a first set of control structures of the plurality of control structures is associated with a first management information base defining a first set of groups of data of the plurality of groups of data, and wherein for each one of the first set of control structures, functions of the first management information base are called to update a first set of tables of the plurality of tables, and wherein a second set of control structures of the plurality of control structures is associated with a second management information base defining a second set of groups of data different from the first set of groups of data, and wherein for each one of the second set of control structures, functions of the second management information base are called to update a second set of tables of the plurality of tables, and wherein the functions of the first management information base include a first extract function and a first update function, wherein the first set of tables includes a first table, and wherein function calling includes invoking the first extract function to extract a first key from the network packet, and the first update function to update the first table according to the first key, and wherein the functions of the second management information base include a second extract function and a second update function, wherein the first set of tables further includes a second table, and wherein calling further includes invoking the second extract function to extract a second key from the network packet, and the second update function to update the second table according to the second key.

13. The data collection system of claim 12 wherein function calling includes invoking the second extract function to extract a second key from the network packet, and the second update function to update the first table according to the second key.

14. The data collection system of claim 12 wherein the first table includes a plurality of rows respectively identified by a plurality of keys, and wherein invoking the extract function includes updating one of the plurality of rows respectively identified by the first key.

15. The data collection system of claim 14, wherein function calling includes invoking a create function when initially none of the plurality of rows is respectively identified by the first key to insert and initialize a new row respectively identified by the first key in the plurality of rows of the first table.

16. The data collection system of claim 12 wherein at least one of the plurality of tables is accessed to retrieve at least one of the plurality of groups of data.

17. The data collection system of claim 16 wherein the plurality of tables are sorted in at least first and second orders, and wherein at least one of the plurality of groups of data in the first order is retrieved in response to a first command, and at least one of the plurality of groups of data in the second order is retrieved in response to a second command.

18. The data collection system of claim 12 wherein time based statistics of the computerized network are periodically stored.

19. The data collection system of claim 12 wherein the plurality of control structures is arranged as a linked list of control structures, and wherein a control structure is inserted into the linked list.

20. The data collection system of claim 12 wherein the plurality of control structures is arranged as an array of control structures, and wherein a control structure is added to an end of the array.

* * * * *